United States Patent
Yamaguchi et al.

(10) Patent No.: US 10,757,383 B2
(45) Date of Patent: Aug. 25, 2020

(54) PROJECTION APPARATUS, PROJECTION SYSTEM, PROJECTION METHOD, AND COMPUTER READABLE STORAGE MEDIUM

(71) Applicant: CASIO COMPUTER CO., LTD., Tokyo (JP)

(72) Inventors: Tomoharu Yamaguchi, Kodaira (JP); Nobuteru Takahashi, Akishima (JP); Takanori Ishihama, Akishima (JP); Hideyuki Kurosaki, Tachikawa (JP); Masaki Fujimoto, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 222 days.

(21) Appl. No.: 15/462,434

(22) Filed: Mar. 17, 2017

(65) Prior Publication Data
US 2017/0374332 A1 Dec. 28, 2017

(30) Foreign Application Priority Data

Jun. 22, 2016 (JP) ................. 2016-123603

(51) Int. Cl.
*H04N 9/31* (2006.01)
*G06T 15/20* (2011.01)
(Continued)

(52) U.S. Cl.
CPC ....... *H04N 9/3185* (2013.01); *G06K 9/00255* (2013.01); *G06T 3/005* (2013.01);
(Continued)

(58) Field of Classification Search
None
See application file for complete search history.

(56) References Cited

U.S. PATENT DOCUMENTS

| | | | |
|---|---|---|---|
| 6,784,882 B1 * | 8/2004 | Sugiyama | G06T 15/04 345/419 |
| 7,626,589 B2 * | 12/2009 | Berger | G06F 3/1446 345/420 |

(Continued)

FOREIGN PATENT DOCUMENTS

| | | |
|---|---|---|
| CN | 101461251 A | 6/2009 |
| CN | 103731621 A | 4/2014 |

(Continued)

OTHER PUBLICATIONS

Xiang Cao and Ravin Balakrishnan. 2006. Interacting with dynamically defined information spaces using a handheld projector and a pen. In Proceedings of the 19th annual ACM symposium on User interface software and technology (UIST '06). Association for Computing Machinery, New York, NY, USA, 225-234. (Year: 2006).*

(Continued)

*Primary Examiner* — Jayanti K Patel
*Assistant Examiner* — Stefan Gadomski
(74) *Attorney, Agent, or Firm* — Fitch, Even, Tabin & Flannery LLP

(57) ABSTRACT

A projection apparatus includes a matrix expression generation unit which generates viewpoint correction matrices used for a conversion calculation on each of the projection surfaces for an image to be projected, a mask generation unit which generates correction mask data indicating regions corresponding to the viewpoint correction matrices generated by the matrix expression generation unit for the image, and a projection control unit which executes the conversion calculation on the image using each viewpoint correction matrix generated for each corresponding region in the correction mask data generated by the mask generation unit, (Continued)

and thereafter controls the projection unit to project the image.

4 Claims, 5 Drawing Sheets

(51) Int. Cl.
    *G06T 3/00*           (2006.01)
    *G06T 7/73*           (2017.01)
    *G06K 9/00*           (2006.01)
    *H04N 5/232*         (2006.01)

(52) U.S. Cl.
    CPC ............... *G06T 7/74* (2017.01); *G06T 15/20* (2013.01); *H04N 5/23216* (2013.01); *H04N 9/3173* (2013.01); *H04N 9/3194* (2013.01); *G06T 2207/30201* (2013.01); *H04N 5/23238* (2013.01)

(56) References Cited

U.S. PATENT DOCUMENTS

| | | | | |
|---|---|---|---|---|
| 2004/0105090 A1* | 6/2004 | Schultz | .................. | G01C 11/02 356/141.5 |
| 2004/0233394 A1* | 11/2004 | Gohnnan | ............... | G02B 13/06 353/70 |
| 2005/0041217 A1* | 2/2005 | Tajima | ....................... | G06T 3/00 353/69 |
| 2009/0102915 A1* | 4/2009 | Arsenich | .................. | G02B 5/10 348/53 |
| 2009/0303447 A1* | 12/2009 | Turner | .................... | G03B 21/28 353/51 |
| 2009/0310037 A1* | 12/2009 | Jung | ....................... | G03B 21/00 348/744 |
| 2010/0022274 A1* | 1/2010 | Roberts | ............... | H04M 1/0272 455/566 |
| 2010/0100853 A1* | 4/2010 | Ciudad | .................... | G06F 3/012 715/856 |
| 2010/0103174 A1* | 4/2010 | Saraille | ..................... | B44D 2/00 345/427 |
| 2010/0238530 A1* | 9/2010 | Bjelkhagen | ............ | G02B 23/24 359/15 |
| 2010/0315415 A1* | 12/2010 | Asami | ................ | A63B 24/0003 345/419 |
| 2010/0318319 A1* | 12/2010 | Maierhofer | .......... | G01C 15/002 702/150 |
| 2011/0018897 A1* | 1/2011 | Uchiyama | ............ | H04N 9/3176 345/619 |
| 2011/0051210 A1* | 3/2011 | Chikaoka | ........... | G02B 26/0833 359/199.1 |
| 2011/0080335 A1* | 4/2011 | Unger | ....................... | H04N 5/74 345/156 |
| 2011/0157483 A1* | 6/2011 | Reichow | .............. | H04N 9/3161 348/740 |
| 2011/0170767 A1* | 7/2011 | Lemonde | ............. | G01B 11/25 382/154 |
| 2011/0216051 A1 | 9/2011 | Ishiyama | | |
| 2011/0254811 A1* | 10/2011 | Lawrence | ............ | G03H 1/0005 345/175 |
| 2013/0083298 A1* | 4/2013 | Yoshimura | ........... | G03B 21/006 353/69 |
| 2013/0106692 A1* | 5/2013 | Maizels | .................. | G06F 3/011 345/156 |
| 2013/0176351 A1* | 7/2013 | Abele | .................. | G09G 3/3406 345/690 |
| 2013/0194554 A1* | 8/2013 | Aruga | .................. | G03B 21/147 353/69 |
| 2013/0293705 A1* | 11/2013 | Schorr | .................. | G01C 15/002 348/135 |
| 2014/0063545 A1* | 3/2014 | Takahashi | ............. | G06F 3/1293 358/1.15 |
| 2014/0092138 A1* | 4/2014 | Yoshimura | ........... | H04N 9/3185 345/647 |
| 2014/0098124 A1* | 4/2014 | Yoshimura | ........... | H04N 9/3185 345/619 |
| 2015/0009413 A1* | 1/2015 | Sallent Puigcercos | ...................... | G06F 3/04815 348/744 |
| 2015/0089452 A1* | 3/2015 | Dorninger | ............ | G06Q 10/101 715/848 |
| 2015/0138349 A1* | 5/2015 | Hebert | ................... | G01B 11/25 348/136 |
| 2015/0160736 A1* | 6/2015 | Fujiwara | ................. | G06F 3/017 345/156 |
| 2015/0195479 A1* | 7/2015 | Sano | ..................... | H04N 9/3185 348/745 |
| 2015/0222842 A1* | 8/2015 | Kwong | ................ | H04N 9/3182 348/745 |
| 2015/0229896 A1* | 8/2015 | Grundhofer | ......... | H04N 9/3182 348/747 |
| 2015/0261383 A1* | 9/2015 | Lee | .......................... | G06F 3/042 345/175 |
| 2015/0268346 A1* | 9/2015 | Nakamura | .............. | G01S 17/66 356/5.04 |
| 2015/0294491 A1* | 10/2015 | Nungester | ............. | G06F 3/0354 345/173 |
| 2015/0338923 A1* | 11/2015 | Grossinger | ............. | G06F 3/017 455/566 |
| 2016/0014385 A1* | 1/2016 | Sano | ..................... | H04N 9/3185 348/571 |
| 2016/0034030 A1* | 2/2016 | Lee | .......................... | G06F 3/013 345/156 |
| 2016/0078590 A1* | 3/2016 | Aoki | ....................... | G06T 5/006 382/275 |
| 2016/0098862 A1* | 4/2016 | Wilson | .................. | G06T 19/006 345/419 |
| 2016/0173843 A1* | 6/2016 | Ohno | ................... | H04N 5/4403 348/734 |
| 2016/0266650 A1* | 9/2016 | Meekhof | ................. | G06F 3/017 |
| 2016/0295187 A1* | 10/2016 | Sano | ..................... | H04N 9/3194 |
| 2016/0346693 A1* | 12/2016 | Minato | ................... | G03B 21/14 |
| 2017/0084081 A1* | 3/2017 | Ishihara | ................ | G06T 19/006 |
| 2017/0193633 A1 | 7/2017 | Narita et al. | | |
| 2017/0322672 A1* | 11/2017 | Kitani | .................... | G06F 3/0386 |
| 2018/0018761 A1* | 1/2018 | Tanaka | ................. | H04N 9/3185 |
| 2018/0241978 A1* | 8/2018 | Hirota | ...................... | H04N 9/31 |
| 2018/0246302 A1* | 8/2018 | Minefuji | ............... | G02B 13/18 |
| 2018/0295333 A1* | 10/2018 | Chiba | .................... | G03B 21/26 |
| 2019/0025680 A1* | 1/2019 | Hirata | ................... | G02B 13/16 |

FOREIGN PATENT DOCUMENTS

| | | | |
|---|---|---|---|
| CN | 104902201 A | * | 9/2015 |
| JP | 2003-9039 A | | 1/2003 |
| JP | 2013-120347 A | | 6/2013 |
| JP | 2013-247601 A | | 12/2013 |
| WO | 2010/055625 A1 | | 5/2010 |
| WO | 2016/027527 A1 | | 2/2016 |
| WO | WO-2016042256 A1 | * | 3/2016 ............ G09G 3/001 |

OTHER PUBLICATIONS

CNIPA; Application No. 201710236567.2 Office Action dated Oct. 11, 2019.

JPO; Application No. 2016-123603; Notice of Reasons for Refusal dated Apr. 7, 2020.

* cited by examiner

PROJECTION APPARATUS, PROJECTION SYSTEM, PROJECTION METHOD, AND COMPUTER READABLE STORAGE MEDIUM

CROSS-REFERENCE TO RELATED APPLICATION

This application is based upon and claims the benefit of priority from Japanese Patent Application No. 2016-123603, filed Jun. 22, 2016, the entire contents of which are incorporated herein by reference.

BACKGROUND OF THE INVENTION

1. Field of the Invention

The present invention relates to a projection apparatus, a projection system, a projection method, and a computer readable storage medium.

2. Description of the Related Art

Jpn. Appln. KOKAI Publication No. 2013-120347 proposes an image display technique of enabling a viewer who is at a position off of the front of a display screen of an image display apparatus to see an undistorted image.

The technique described in the above patent document is a technique of correcting distortions in an image displayed on a planar surface seen from an viewer.

With a diversity of video viewing methods, commercialization of games using VR (virtual reality) technology, and the popularization of home planetariums, so-called full-spherical-type projection apparatuses for continuously projecting an image not only on a single surface, but on multiple surfaces (for example, a ceiling, four walls, and a floor of a room) have been proposed.

In a full spherical-type projection apparatus, with the exception of a surface in the direction of the proximal end of the mounting for the apparatus, it is possible to continuously project an image on almost all the surfaces by performing projection by, for example, fixing the main body of the apparatus on the ceiling with mounting brackets.

However, if an image is projected with such a projection apparatus, a viewer may see a distorted image, such as a curved line that was originally a straight line in the original image, especially when the image is projected on a corner where walls intersect, because the location of the projection lens and the position of the viewer's viewpoint are different.

The present invention has been achieved in view of such circumstances, and it is an object of the present invention to provide a projection apparatus, a projection system, a projection method, and a computer readable storage medium, which are capable of projecting an image that is easy for a viewer to see when the image is projected on a full-spherical surface.

SUMMARY OF THE INVENTION

According to one aspect of the present invention, there is provided a projection apparatus comprising: a projection unit which projects images; a surface information obtaining unit which obtains information of a plurality of projection surfaces on which the projection unit performs projection; a viewpoint information obtaining unit which obtains position information of a viewer's viewpoint with respect to the projection unit; and a processor configured to: generate based on the information of the plurality of projection surfaces obtained by the surface information obtaining unit and the position information of the viewer's viewpoint obtained by the viewpoint information obtaining unit, viewpoint correction matrices used for a conversion calculation on each of the projection surfaces for an image to be projected by the projection unit; generate correction mask data indicating regions corresponding to the viewpoint correction matrices for the image; and execute the conversion calculation on the image using each viewpoint correction matrix for each corresponding region in the correction mask data, and thereafter control the projection unit to project the image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described.

First Embodiment

Hereinafter, the first embodiment, wherein the present invention is applied to a projector 10 that is fixed with mounting brackets at approximately the center of the ceiling of a room, will now be described with reference to the accompanying drawings.

Figure 1:
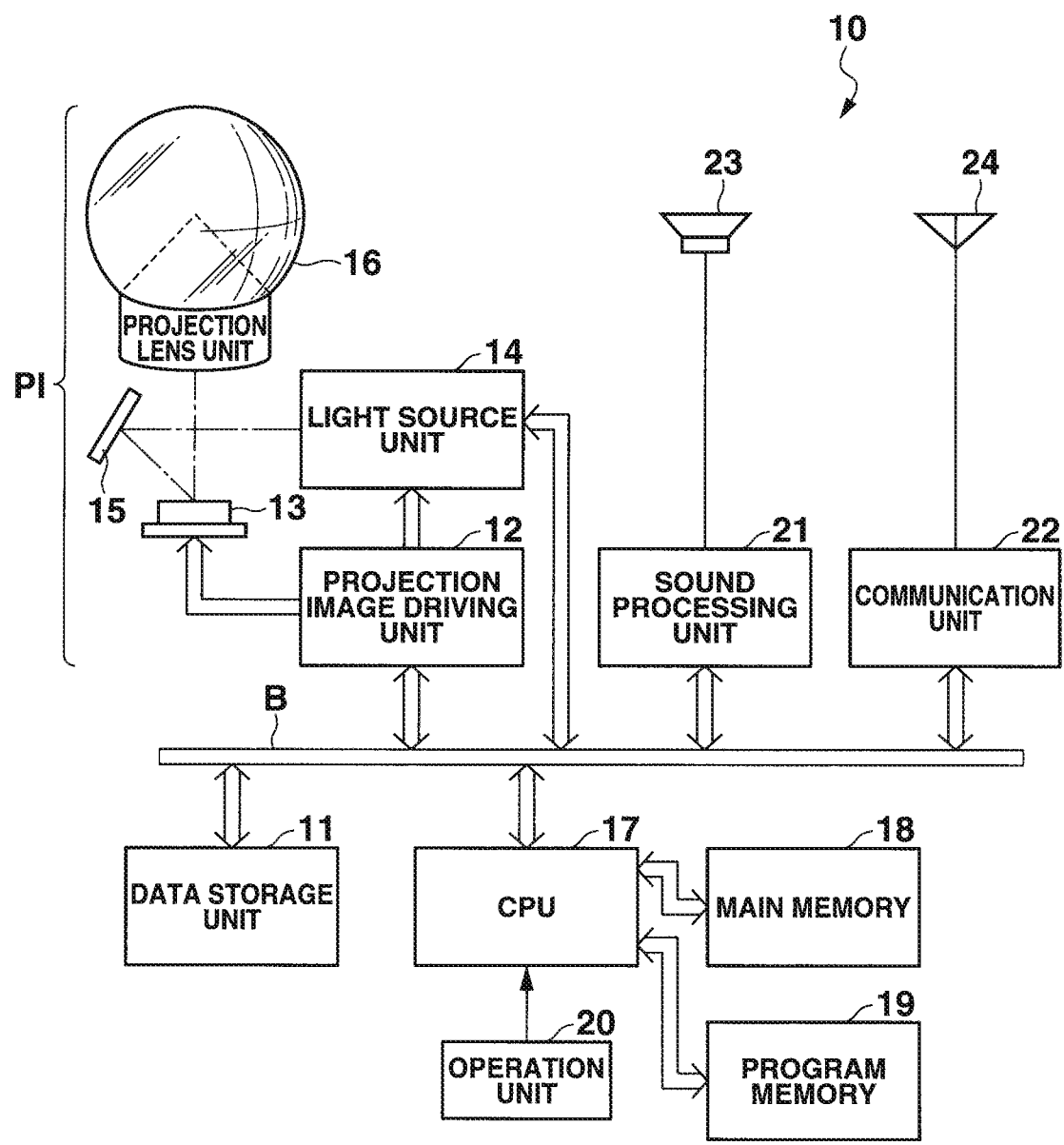
FIG. 1 is a block diagram showing the function and configuration mainly of electronic circuitry of the projector according to the first embodiment.

FIG. 1 explains the function and configuration of mainly the electronic circuitry of the projector 10. In FIG. 1, image data to be projected is read from a data storage unit 11 and sent to a projection image driving unit 12 via a bus B.

The data storage unit 11 also stores correction mask data and viewpoint correction matrices data, etc., which will be described later.

The projection image driving unit 12 drives micromirror elements 13, which are display elements, to display the sent image data by a more rapid time-divisional drive, which is a result of multiplying a frame rate in accordance with a predetermined format (e.g., a multiplication of 120 frames per second) by the number of color components and the number of grayscale levels to display, in accordance with the sent image data.

The micromirror element 13 generates an optical image with reflected light produced by quickly changing each of the tilt angles of multiple micromirrors arranged in an array, for example, micromirrors of WXGA (1280 pixels×768 pixels) between an on or off state.

On the other hand, light in primary colors (R, G, B) are circularly emitted from the light source unit 14 in a time-divisional manner. The light source unit 14 has a semiconductor LED, and repeatedly emits light in primary colors (R, G, B) in a time-divisional manner. The LED of the light source unit 14 may be an LD (semiconductor laser) and an organic EL element as an LED in a broad sense.

Light in a primary color having a wavelength different from original light, which is excited when light emitted from the LED is reflected on a phosphor, may be used. This light in a primary color from the light source unit 14 is completely reflected on a mirror 15 and irradiated onto the micromirror elements 13.

A light figure is generated with light reflected from the micromirror elements 13, and the generated light figure is projected onto the outside of the projector through the projection lens unit 16.

The projection lens unit 16 projects a full spherical image in all directions, using a super-wide-angle lens, a so-called fisheye lens, except for the proximal direction. For example, the projection angle of view 270 degrees on the surface along the projection light axis, and the projection angle of view 360 degrees on the surface orthogonal to the projection light axis can be realized.

The projection image driving unit 12, the micromirror elements 13, the light source unit 14, the mirror 15, and the projection lens unit 16 constitute a projection system PI.

All the operations on each of the foregoing circuits are controlled by the CPU 17. The CPU 17 is directly connected to a main memory 18 and a program memory 19. The main memory 18 is configured with SRAM, etc., and functions as a work memory of the CPU 17. The program memory 18 is configured with an electrically-rewritable non-volatile memory, such as a flash ROM, and stores operation programs executed by the CPU 17, and a variety of typical data, etc.

The CPU 17 reads the operation programs and typical data, etc. stored in the program memory 19, and engages and stores the read program or data on the main memory 19 to execute the program, so as to integrally control the projector 10.

The CPU 17 performs various types of projection operations in accordance with operation signals from an operation unit 20. The operation unit 20 includes some operation keys of the main body of the projector 10 and a receiving unit which performs key operation signals from a remote controller (not shown in the drawing) dedicated for the projector 10, and sends signals in accordance with the received key operation signals to the CPU 17.

The CPU 17 is further connected to a sound processing unit 21 and a communication unit 22 via the bus B.

The sound processing unit 21 comprises a sound source circuit, such as a PCM sound source, converts sound signals given at the time of a projection operation, and drives the speaker unit 23 to generate sound, or a beep sound, etc. as needed.

The communication unit 22 carries out transmission and reception of data with external devices of the projector through the antenna 24 by, for example, a wireless LAN communication in compliance with IEEE 802.11a/11b/11g/11n/11ac and a short-distance wireless communication in compliance with IEEE 802.15.

Next, the operation of the above embodiment will be described.

Figure 2:
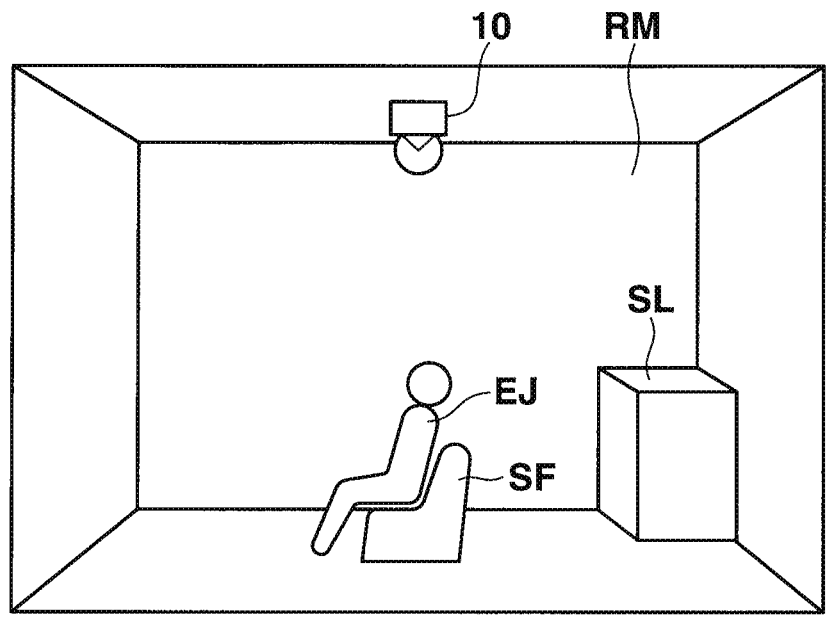
FIG. 2 is a drawing showing an example of an environment of a viewer and a room where a projector according to the first embodiment is assumed to be used.

FIG. 2 is a drawing showing an example of an environment of a room and a viewer EJ where the projector 10 is assumed to be used. In the same drawing, the projector 10 is set at approximately the center of the ceiling of the room RM by dedicated ceiling-hung mounting brackets (not shown in the drawing), and the projection optical axis of the projection lens unit 16 is directed directly underneath the ceiling.

Herein, the viewer EJ sitting on a sofa SF which is arranged approximately underneath the projector 10 is facing the wall shown in the left of the drawing. A shelf SL is arranged in the corner at the right back of the room viewed from the viewer EJ.

As the initial setting operation at the time of setting the projector 10 for the first time, a viewpoint correction process is carried out to set a viewpoint position of the viewer EJ. Furthermore, it is necessary to carry out the viewpoint correction process to change a projection surface when the room RM is rearranged including the shelf SL.

Figure 3:
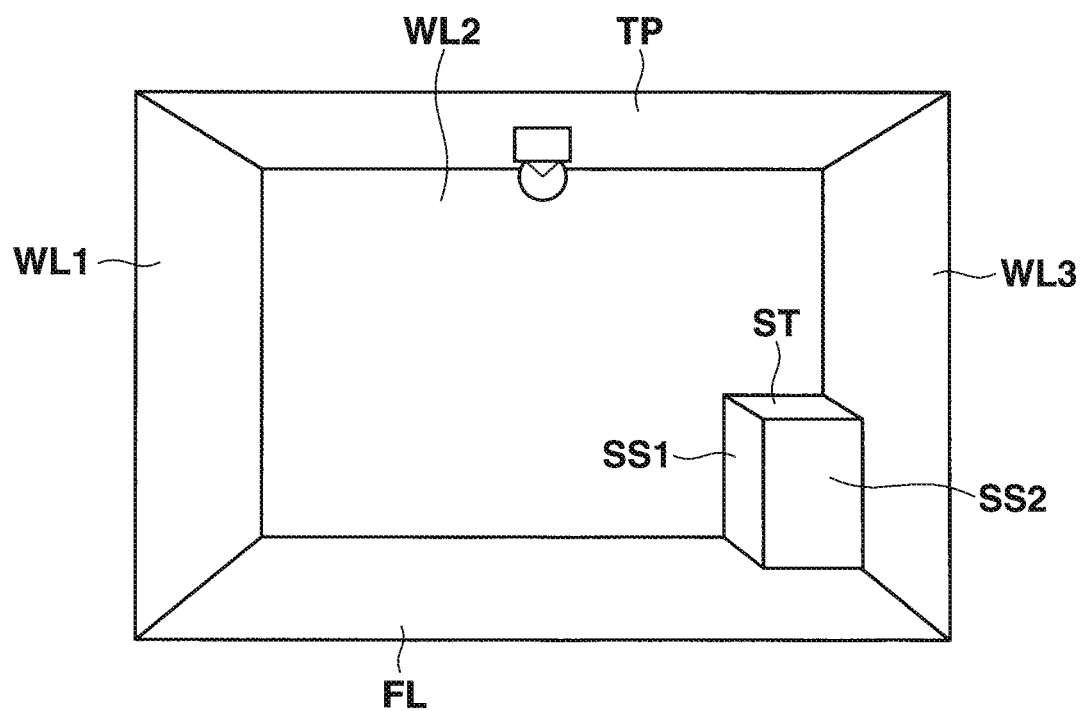
FIG. 3 is a drawing showing projection surfaces that the projector should recognize in the projection environment shown in FIG. 2 according to the first embodiment.

FIG. 3 shows a projection surface that the projector 10 should recognize in the projection environment shown in FIG. 2. In other words, the projection surface herein consists of a ceiling surface TP, wall surfaces WL1, WL2, WL3, and WL4, a floor surface FL, a shelf top surface ST, and shelf side surfaces SS1 and SS2. Although the wall surface WL4 is not shown in FIG. 3 which is a developed view of the room RM, the wall surface WL4 is a wall facing the wall WL2 and adjacent to the wall WL1 and the wall WL3.

Figure 4:
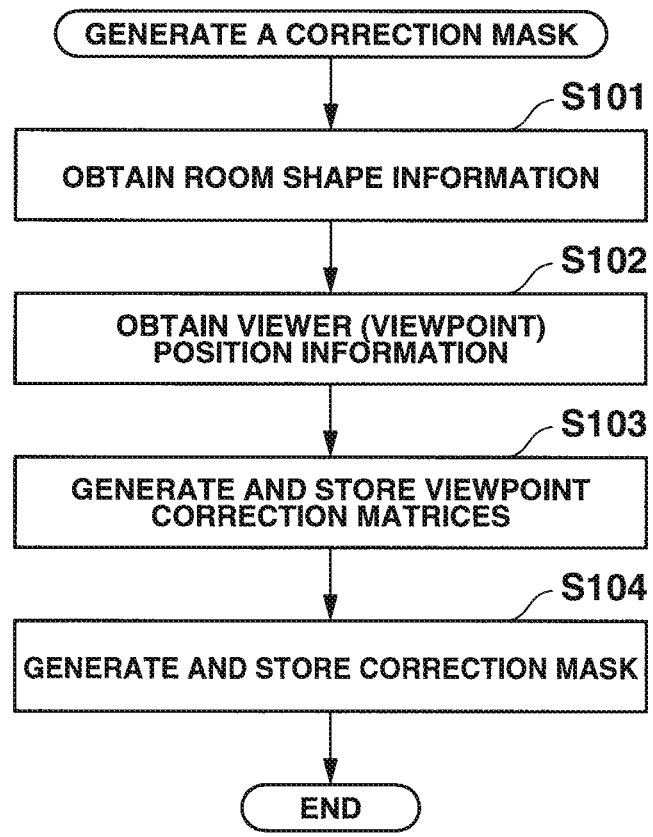
FIG. 4 is a flowchart showing a basic process of an initial setting operation which is performed the first time the projector according to the first embodiment is set.

Next, with reference to FIG. 4, a flow of the basic process of the above-described initial setting operation, which is operated when the projector 10 is arranged for the first time, is explained.

The operation which will be described below is executed after the CPU 17 of the projector 10 retrieves an operation program, etc. from the program memory 19, and activates it on the main memory, as described above. The operation programs, etc. stored in the program memory 19 include not only programs stored in the program memory 19 at the time of shipping the projector 10 from the factory, but also programs that can be installed by a user after the purchase of the projector 10 for upgrading.

First, the CPU 17 obtains shape information of the room RM from an external device, for example, a personal computer onto which an application program dedicated for the projector 10 is installed, via the antenna 24 and the communication unit 22 (step S101).

In other words, in the application program, for example, the shape of the room, the length and width of the floor, the height of the room, the location and direction in which the projector is set, and locations and dimensions of major objects are input in accordance with a procedure, and necessary information is generated and sent to the projector 10. The CPU 17 of the projector 10 which obtains the information stores the obtained information in the data storage unit 11.

Next, the CPU 17 obtains information of a viewpoint position of the viewer EJ from an external device via the antenna 24 and the communication unit 22 (step S102).

In other words, in the application program, the location where the viewer EJ sits in the room RM, the height of the viewpoint, and directions of major lines of sight are input in accordance with a procedure, and the necessary information is generated and sent to the projector 10. Thus, the position information of the viewer's viewpoint with respect to the projector 10 can be obtained. Similarly to the manner described above, the CPU 17 of the projector 10 which obtains the information stores the obtained information in the data storage unit 11.

Next, the CPU 17 which has obtained the information of the room shape and the position information of the viewer's viewpoint generates, for each projection surface, viewpoint correction matrices for converting a projection location of the image so that the image looks continuous from the viewer's viewpoint, and the CPU 17 further stores the generated viewpoint correction matrices in the data storage unit 11 (step S103). Surface information of a projection surface may be obtained not only for a planar surface, but also a curved surface.

Furthermore, the CPU 17 generates correction mask data to allocate, from the generated viewpoint correction matrices, a viewpoint correction matrix to a projection surface in accordance with a pixel location in the image to be projected, and the CPU 17 further stores the generated correction mask data in the data storage unit 11 (step S104), and the process shown in FIG. 4 is finished.

Figure 5:
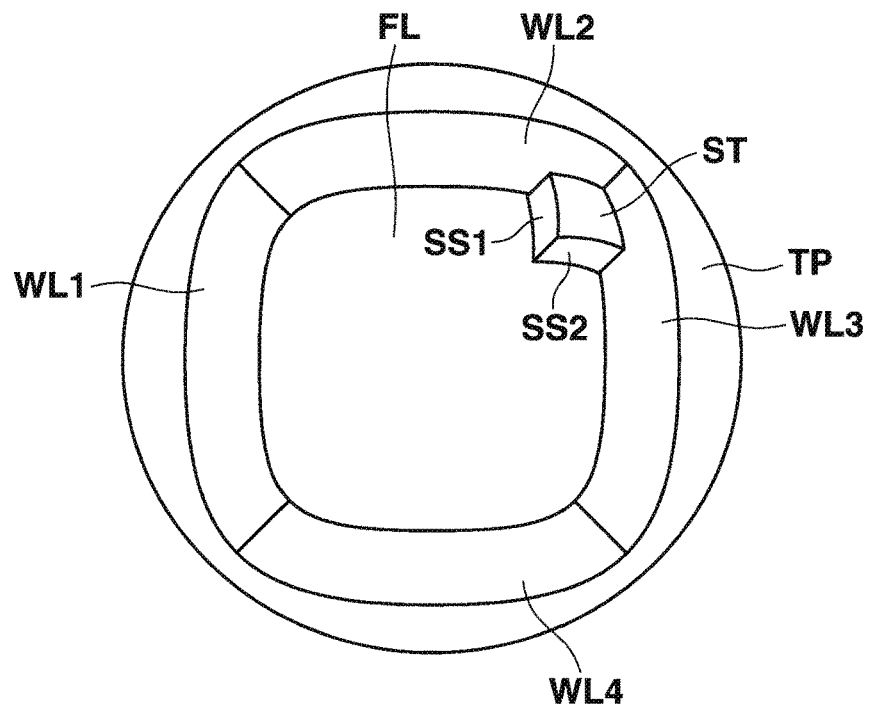
FIG. 5 is a drawing showing correction mask data according to the first embodiment.

FIG. 5 is a drawing illustrating correction mask data generated by the CPU 17 through the process shown in FIG. 4. As described above, the projection lens unit 16 is a fisheye lens, and it has the projection angle of view on a surface along the projection light axis of the order of 270 degrees, and the projection angle of view on a surface orthogonal to the projection light axis of the order of 360 degrees.

The original image used for projection has a circular shape, and the image is divided into regions in accordance with the projection surfaces as shown in FIG. 5. The viewpoint correction matrices are stored in the data storage unit 11 for respective regions corresponding to the projection surfaces, and the image viewed from the viewpoint of the viewer EJ will look natural on each projection surface by performing coordinate conversion using the viewpoint correction matrices.

Figure 6:
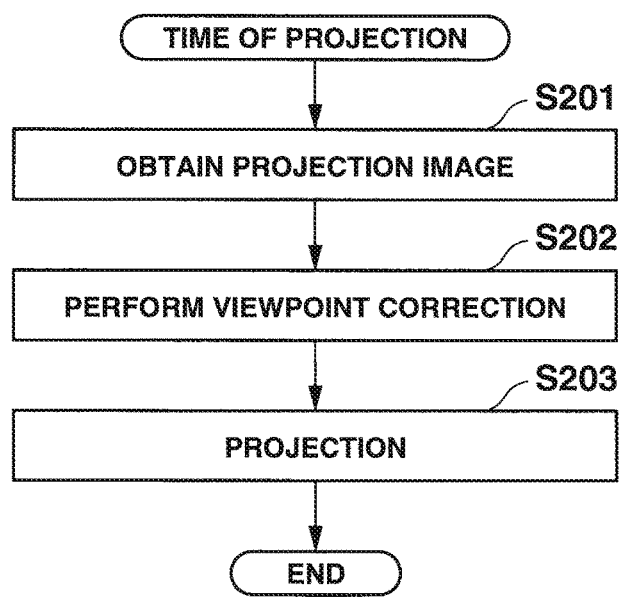
FIG. 6 is a flowchart showing a basic process at the time of a projection operation according to the first embodiment.

FIG. 6 is a drawing showing a flow of the basic process that is carried out, after the above-described initial setting of the projector 10 is finished, for one individual frame of image data, when video data actually stored in the data storage unit 11, or external video data anytime sent through the antenna 24 and the communication unit 22 are reproduced.

In other words, after reading individual image data constituting the video data from the data storage unit 11 prior to projection, or after obtaining the image data through the antenna 24 and the communication unit 22 (step S201), the CPU 17 performs viewpoint correction calculation using the correction mask data and the viewpoint correction matrices (step S202).

In this viewpoint correction calculation, for the original image data as described in the foregoing, calculation to convert a coordinate position of projection using a corresponding viewpoint correction matrix is performed on each pixel information for each of the projection surfaces that are divided by the correction mask data. The conversion calculation makes an entire image viewed from a viewpoint of the viewer EJ look continuous and normal.

When synchronously performing the display operation in the micromirror elements 13 by the projection image driving unit of the projection system PI and the light emitting operation by the light source unit 14, using the projection image on which the conversion has been performed, the projection image is projected on almost all surfaces of the room RM by the projection lens unit 16 by reflective light of the micromirror elements 13 (step S203).

According to the present embodiment as described above, it is possible to project a natural image and that is easy for a viewer to see when a full-spherical-type image is projected.

In the foregoing embodiment, the shape information of the room RM where the projector 10 is set and the viewpoint position information of the viewer EJ are input from external devices; however, the embodiment is not limited thereto. In order to obtain shape information of the room RM and viewpoint position information of the viewer, the projector 10 itself may comprise an imaging unit including a lens optical system having optical properties equivalent to those of the foregoing projection lens unit 16 to capture an image of the room RM.

In this case, a color opening filter consisting of color filters of two different colors may be arranged at the lens opening of the imaging unit, for example, to detect a distance to an object for each pixel by performing image analysis on blurriness and color registration errors which occur in an image captured by the lens depending on a distance to an object.

Thus, while location information of each divided projection surface is extracted in accordance with continuity of changes in a distance between neighboring pixels based on an obtained distance image, it is possible to obtain position information of a viewer's viewpoint from the distance image and a location of the viewer in the captured image on which an object extracting process and a facial recognition process are performed.

Thus, the projector 10 comprising an imaging unit enables itself to perform the initial setting operation explained with reference to FIG. 2 to FIG. 6, thereby facilitating the handling of the projector 10.

Second Embodiment

In the following, it is assumed that the present invention is a portable projector, and the second embodiment in which the present invention is applied to a projection system that performs initial setting using a dedicated application program installed onto a smartphone, for example, will be explained.

The functional circuit configuration of the projector is basically the same as that shown in FIG. 1, and the same reference symbols are used for the same elements, and repetitive illustration and descriptions will be omitted.

Similarly, assuming that the configuration of the hardware circuit of the smartphone is similar to that of a well-known technique, illustrations and descriptions thereof will be omitted.

Figure 7:
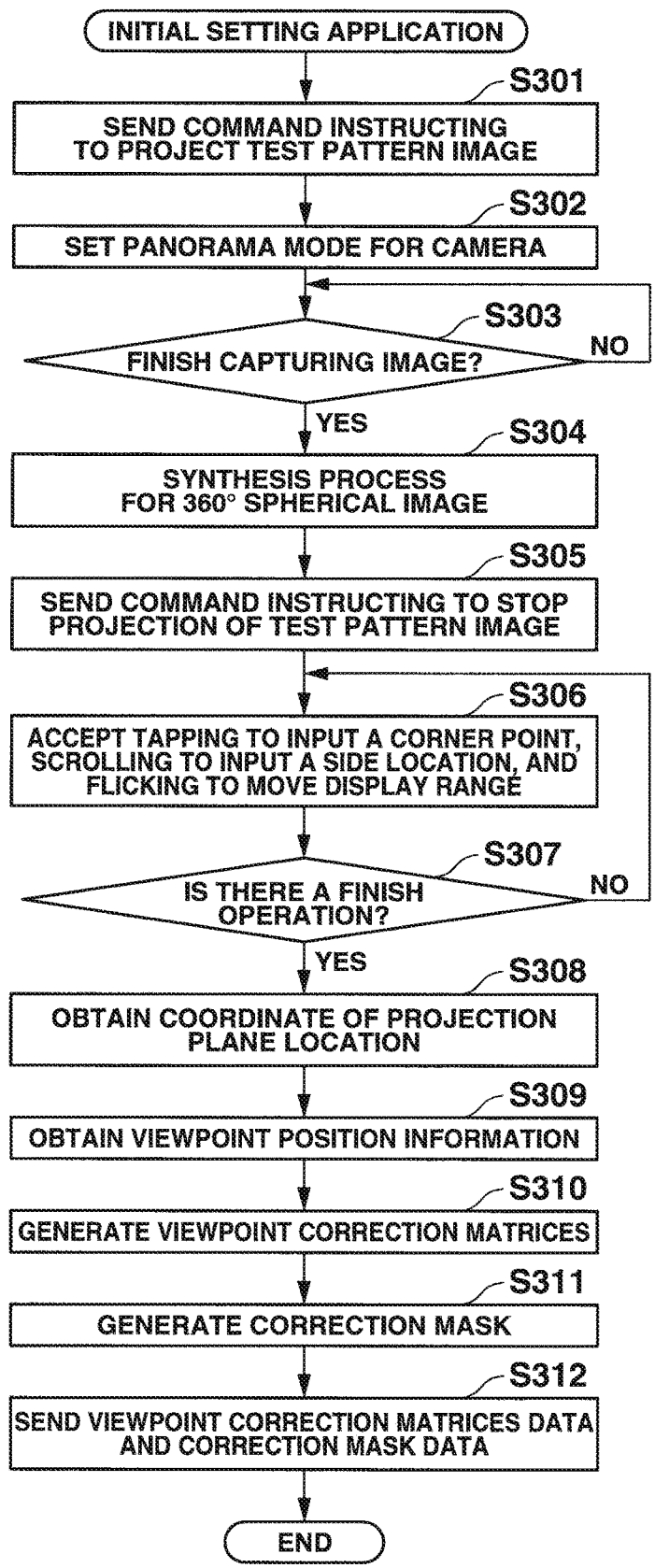
FIG. 7 is a flowchart showing a process at the time of performing an initial setting operation according to the second embodiment of the present invention.

FIG. 7 is a flowchart showing a process for the initial setting of the projector 10 by an application program installed on the smartphone. According to FIG. 7, after setting the portable projector 10 at a location where image projection is performed as desired and turning on the power, the user as a viewer who is at a viewing location starts the application program on the smartphone to perform the initial setting.

At the beginning of the process, a command instructing projection of a test pattern image is sent from the smartphone to the projector 10 (step S301).

On the projector 10 side where the command is received via the antenna 24 and the communication unit 22, the CPU 17 reads image data of test patterns which are stored in the data storage unit 11 in advance, and projects a test pattern image using the projection system PI.

On the smartphone, among camera modes, a panorama capture mode in which a capture range is moved while capturing an image is automatically set after sending the command so as to accept a holding operation of the shutter button, and capturing an image of the projected test pattern image is performed (step S302).

When capturing an image in the panorama mode, the user of the smartphone continues capturing an image with the smartphone, rotating their body in a horizontal direction from the viewing position, and turns the shutter operation off at the time of finishing capturing an image in 360 degrees. For example, capturing the image continues from when the finger presses the shutter button until the finger is removed.

If the image capture range of the vertical direction (from the floor to the ceiling) is narrower than the range of the projected test pattern image while the capture angle of view of the lens optical system of the smartphone is set to be the widest at the time of capturing an image in the panorama mode, the user may continue capturing an image for two rotations to capture an image of 720 degrees, i.e., 360 degrees for the upper part and 360 degrees for the lower part of the test pattern image.

In the smartphone, whether or not the image capture is finished is determined based on whether or not the off operation is performed for the shutter button (step S303). Herein, if it is determined that the off operation for the shutter button has not been performed and the image capture has not been finished ("No" in step S303), the image capture in the panorama mode is continued to await the off operation for the shutter button.

In step S303, when the off operation is performed for the shutter button and it is determined that the image capture is finished ("Yes" in step S303), a synthesis process for the test pattern image captured by the smartphone is performed in the smartphone, so that the boundary portions are put together as a continuous image in a spherical shape in the range of 360 degrees (step S304).

Subsequently, a command instructing to stop the projection of the test pattern image is sent to the projector 10 from the smartphone (step S305).

On the projector 10 side where the command is received via the antenna 24 and the communication unit 22, the CPU 17 stops the projection of the test pattern image by the projection system PI upon the reception of the command.

Furthermore, while an image obtained by the synthesis process is displayed on a display of the smartphone, the smartphone accepts on a touchscreen integrally provided on the display, tapping to input a point which constitutes a corner of a projection surface, scrolling to input a location of a side of the projection surface, and flicking to move the displayed image on the display, thereby accepting the inputs to define the projection surfaces in the captured image as inputs of coordinate positions corresponding to the test pattern image (step S306).

In this case, the image of the test pattern image displayed on the display may be enlarged or reduced by the spread operation and the pinch operation using two fingers on the touchscreen.

While acceptance of those inputs is being carried out, it is determined whether or not an operation indicating that the inputs to define all the projection surfaces are finished is input (step S307).

If it is determined that the inputs to define all the projection surfaces have not been yet finished and the operation indicating the finish of the input has not been yet input ("No" in step S307), the process returns to step S306, and the step of accepting the inputs to define the projection surfaces will be successively performed.

While the process at step S306 and step S307 is repeated in such a manner to accept the inputs to define the projection surfaces, the process awaits an operation indicating that the input is finished.

Furthermore, in step S307, when it is determined that the inputs to define all the projection surfaces are finished and an operation indicating the finish is input ("Yes" in step S307), the smartphone calculates and obtains from the touch inputs made on the test pattern image captured by the smartphone, coordinate information of position for each of the plurality of projection surfaces constituting the environment where the projector 10 is set (step S308).

Next, with the smartphone, coordinate information of the viewpoint position of the user (viewer) surrounded by the projection surfaces is calculated and obtained (step S309).

In the smartphone which obtains the coordinate information of position for the projection surfaces of the room and the coordinate information of the viewer's viewpoint position, for each projection surface, viewpoint correction matrices for converting a projection location of the image so that the image looks continuous from the viewer's viewpoint, is generated by calculation (step S310).

Furthermore, in the smartphone, correction mask data is generated from the generated viewpoint correction matrices by calculation in order to allocate a viewpoint correction matrix to a projection surface in accordance with a pixel location in the image to be projected (step S311).

Finally, the smartphone sends the generated viewpoint correction matrices data and the correction mask data to the projector 10 (step S312), and finishes the application program for the initial setting of the projector shown in FIG. 7.

Hereinafter, the CPU 17 of the projector 10, which has received the viewpoint correction matrices data and the correction mask data from the smartphone via the antenna 24 and the communication unit 22, transforms the image based on the information, thereby enabling the projector to project the image in accordance with the shape of the projection environment and the viewer's viewpoint position.

In the foregoing embodiment, the process of generating the viewpoint correction matrices data and the correction mask data by calculation has been explained; however, the calculation process may be executed on the projector 10 side.

According to the present embodiment as described above, since it is possible to carry out the initial setting for a portable projector 10 using a mobile information device having an imaging unit and a communication unit such as a smartphone, an image that is natural and easy for a viewer to see can be projected for a full spherical-type image projection, while simplifying the handling.

In addition, in the present embodiment, inputs to define the projection surfaces can be accepted through an operation of a touchscreen which is integrally provided with a display of a mobile information device, thereby projecting an image easy to view and simplifying the handling.

A mobile information device which carries out the above-described initial setting of the projector 10 is not limited to a smartphone; it may be a device having an imaging unit and a communication unit, such as a tablet personal computer, or a general feature phone.

Other than the above, the present invention is not limited to the above-described embodiments, and can be modified in various manners in practice when implementing the invention without departing from the gist of the invention. The functions carried out by the foregoing embodiments may be realized in a combination to the greatest extent possible. The above-described embodiments include various stages, and a variety of inventions can be derived by properly combining structural elements disclosed in connection with the embodiments. For example, if the advantages of the invention are attained even after some of the structural elements disclosed in connection with the embodiments are deleted, the structure made up of the resultant structural elements can be extracted as an invention.

What is claimed is:

1. A system having a projection apparatus which includes a projection lens unit which projects a full spherical image in all directions except for a proximal direction and an imaging apparatus which performs image capturing for a projection range in which the image is projected in the direction by the projection apparatus,
    the imaging apparatus comprising:
    a processor configured to:
    perform a synthesis process for a test pattern image which is projected by the projection apparatus and captured by the imaging apparatus such that boundary portions are put together as a continuous image to form the full spherical image;
    accept an input to define a plurality of projection surfaces in the captured image, which is obtained by capturing the test pattern image to be projected by the projection apparatus from a viewer's viewpoint position with the imaging apparatus;
    obtain, based on the defined plurality of projection surfaces, coordinate information of position for each of the plurality of projection surfaces and coordinate information of the viewer's viewpoint position;
    generate, based on the coordinate information of position for each of the plurality of projection surfaces and the coordinate information of the viewer's viewpoint position, viewpoint correction matrices used to execute conversion on a projection location of an image to be projected for each projection surface so that the image looks continuous from the viewer's viewpoint position; and
    generate, based on the viewpoint correction matrices, correction mask data in which each of the viewpoint correction matrices is allocated to a corresponding projection surface in accordance with a pixel location in the image to be projected, and
    the projection apparatus comprising:
    a processor configured to perform conversion processing on the image, by executing conversion on a coordinate position of projection on each pixel information, for each of the plurality of projection surfaces, using a corresponding viewpoint correction matrix, based on the correction mask data, and thereafter controls the projection apparatus to project the image.

2. The system according to claim 1, wherein
    the imaging apparatus comprises a touchscreen integrally provided with a display unit, and
    wherein the processor of the imaging apparatus is configured to:
    display on the display unit, an image which is obtained by capturing a test pattern image to be projected by the projection apparatus from the viewer's viewpoint position with the imaging apparatus, and defines division of the plurality of projection surfaces by accepting an operation for the displayed image on the touchscreen.

3. A projection method applied to a system having a projection apparatus which includes a projection lens unit which projects a full spherical image in all directions except for a proximal direction and an imaging apparatus which performs image capturing for a projection range in which the image is projected in the direction by the projection apparatus, the method comprising:
    performing a synthesis process for a test pattern image which is projected by the projection apparatus and captured by the imaging apparatus such that boundary portions are put together as a continuous image to form the full spherical image;
    accepting an input to define a plurality of projection surfaces in the captured image, which is obtained by capturing the test pattern image to be projected by the projection apparatus from a viewer's viewpoint position with the imaging apparatus;
    obtaining coordinate information of position for each of a plurality of projection surfaces on which the projection apparatus performs projection;
    obtaining coordinate information of the viewer's viewpoint position;
    generating, based on the obtained coordinate information of position for each of the plurality of projection surfaces and the obtained coordinate information of the viewer's viewpoint position, viewpoint correction matrices used to execute conversion on a projection location of an image to be projected for each projection surface so that the image looks continuous from the viewer's viewpoint position;
    generating, based on the viewpoint correction matrices, correction mask data in which each of the viewpoint correction matrices is allocated to a corresponding projection surface in accordance with a pixel location in the image to be projected; and
    performing conversion processing on the image, by executing conversion on a coordinate position of projection on each pixel information, for each of the plurality of projection surfaces, using a corresponding viewpoint correction matrix, based on the correction mask data, and thereafter causing the projection apparatus to project the image.

4. A non-transitory computer-readable storage medium having a program stored thereon for controlling a computer in a system having a projection apparatus which includes a projection lens unit which projects a full spherical image in all directions except for a proximal direction and an imaging apparatus which performs image capturing for a projection range in which the image is projected in the direction by the projection apparatus, to perform functions comprising:
    performing a synthesis process for a test pattern image which is projected by the projection apparatus and captured by the imaging apparatus such that boundary portions are put together as a continuous image to form the full spherical image;
    accepting an input to define a plurality of projection surfaces in the captured image, which is obtained by capturing the test pattern image to be projected by the projection apparatus from a viewer's viewpoint position with the imaging apparatus;

obtaining coordinate information of position for each of a plurality of projection surfaces on which the projection apparatus performs projection;

obtaining coordinate information of the viewer's viewpoint position;

generating, based on the obtained coordinate information of position for each of the plurality of projection surfaces and the obtained coordinate information of the viewer's viewpoint position, viewpoint correction matrices used to execute conversion on a projection location of an image to be projected for each projection surface so that the image looks continuous from the viewer's viewpoint position;

generating, based on the viewpoint correction matrices, correction mask data in which each of the viewpoint correction matrices is allocated to a corresponding projection surface in accordance with a pixel location in the image to be projected; and performing conversion processing on the image, by executing conversion on a coordinate position of projection on each pixel information, for each of the plurality of projection surfaces, using a corresponding viewpoint correction matrix, based on the correction mask data, and thereafter controlling the projection apparatus to project the image.

\* \* \* \* \*